UNITED STATES PATENT OFFICE.

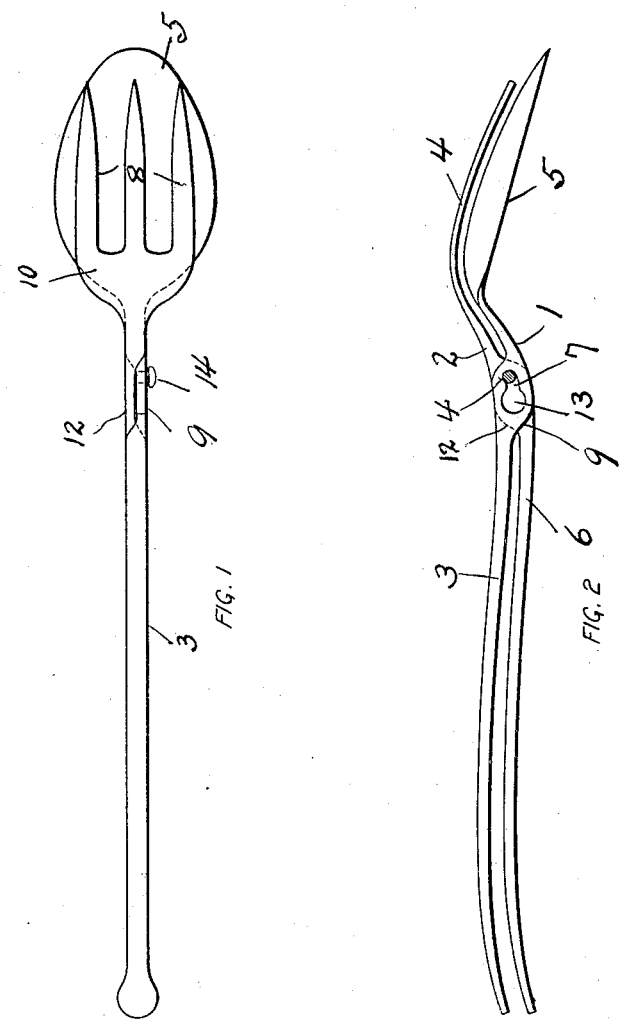

JOSEPH WHITE, OF MIDDLESEX BOROUGH, NEW JERSEY, ASSIGNOR TO MINNIE E. WHITE, OF MIDDLESEX, NEW JERSEY.

TABLE UTENSIL.

1,367,649.  Specification of Letters Patent.  Patented Feb. 8, 1921.

Application filed October 28, 1919. Serial No. 333,863.

*To all whom it may concern:*

Be it known that I, JOSEPH WHITE, a citizen of the United States, residing in the borough of Middlesex, county of Middlesex, State of New Jersey, (whose post-office address is Boundbrook, New Jersey,) have invented a certain new and useful Table Utensil for the purpose of handling and compressing the juice from pieces of fruit—for instance, when a slice of lemon is served with a dish which it is desired to flavor with the juice—and for the sake of economy I have made this article of tableware so that the parts composing it can be used separately as a piece of tableware, such as a spoon, fork, or knife. Thus when oysters are served the lemon can be squeezed with the combined utensil and then one member used as a fork. When iced tea is served, the lemon may be squeezed with the utensil and the spoon separately used, either before or after the use of the combined utensil.

Referring to the drawings which form part of this specification: Figure 1 is a plan view of the device, and Fig. 2 is a side elevation.

The device consists in the form illustrated of two parts; 1, a spoon; and 2, a fork. The spoon consists of the handle 3 and bowl 5, and the fork of the bowl 4 and the handle 6. The bowl 4 consists of the tines 8 and their base 10. The fork 2 has a lug 12 on which is fastened or formed a pivot 14 which pivots in a slot 7 on the lug 9 of the spoon. This slot is elongated and widened at 13 in order to admit the head of the pivot when putting the parts together, and when slid to the position shown the head holds the two pieces together.

It can be seen that by separating the handles 3 and 6, the bowls 4 and 5 can be separated so as to grasp a piece of lemon or other fruit, and when the handles are worked toward each other, the bowls will squeeze what is between them. It is to be understood that the two parts may be pivoted in various ways and in various places other than that shown in the drawings, and that the two parts may be of different shapes and still fall within the scope of the invention.

What I claim is:

1. A new table utensil, comprising two separately usable pieces of table cutlery, each having a bowl and a handle, and detachably pivoted together between the bowls and the handles, whereby the juice may be expressed from a piece of fruit placed between the bowls, by moving the handles together.

2. A table utensil for compressing the juice from fruit, having two members detachably pivoted together, and one of said members being independently usable as a spoon.

3. A table utensil for compressing the juice from fruit, having two members detachably pivoted together, and one of said members being independently usable as a fork.

In witness whereof I have hereunto set my hand in the presence of two subscribing witnesses.

JOSEPH WHITE.

Witnesses:
  WILLIAM LOVE,
  MINNIE E. WHITE.